(12) United States Patent
Thacker

(10) Patent No.: US 6,227,592 B1
(45) Date of Patent: May 8, 2001

(54) PICKUP BED COVER

(76) Inventor: Gary W. Thacker, 5255 N. Avenida Largo, Tucson, AZ (US) 85745

( * ) Notice: Subject to any disclaimer, the term of this patent is extended or adjusted under 35 U.S.C. 154(b) by 0 days.

(21) Appl. No.: 09/632,514

(22) Filed: Aug. 4, 2000

Related U.S. Application Data

(60) Provisional application No. 60/148,436, filed on Aug. 11, 1999.

(51) Int. Cl.$^7$ .............................. B60P 3/34; E04H 15/06
(52) U.S. Cl. .................................... 296/26.07; 296/26.04; 296/100.08; 296/100.1; 296/100.17
(58) Field of Search .......................... 296/26.02, 26.04, 296/26.06, 26.07, 100.02, 100.06, 100.07, 100.08, 100.1, 100.17, 160, 165, 167

(56) References Cited

U.S. PATENT DOCUMENTS

| | | | |
|---|---|---|---|
| 2,531,140 | * 11/1950 | Linde | 296/100.08 |
| 3,155,423 | * 11/1964 | Cripe | 296/100.08 |
| 3,649,073 | * 3/1972 | Whittemore | 296/100.08 |
| 4,310,194 | * 1/1982 | Biller | 296/159 |
| 5,102,185 | * 4/1992 | Lake | 296/165 |
| 5,203,364 | * 4/1993 | Koole | 135/148 |
| 5,213,390 | * 5/1993 | Borchers | 296/165 |
| 5,364,154 | * 11/1994 | Kaiser | 296/100.07 |
| 5,366,266 | * 11/1994 | Harbison | 296/100 |
| 5,375,900 | * 12/1994 | Tessenyi et al. | 296/100.08 |
| 5,595,418 | * 1/1997 | Medlin | 296/100 |
| 5,971,446 | * 10/1999 | Lunney, II | 269/100.08 |
| 5,988,728 | * 11/1999 | Lund et al. | 296/100.03 |

FOREIGN PATENT DOCUMENTS

2407118 * 6/1979 (FR) .................................. 296/26.07

* cited by examiner

Primary Examiner—D. Glenn Dayoan
Assistant Examiner—Paul Chenevert
(74) Attorney, Agent, or Firm—Mark E. Ogram P.C.

(57) ABSTRACT

A truck bed cover secured to a bed of a truck is described which utilizes two leg assemblies which are connected to the bed of the truck. The cover is swivelly connected to these leg assemblies allowing the cover to be raised or lowered. In an up position, the cover is locked in position using a locking bar from the cover to the rear-most leg assembly; in a down position, the cover is locked to the bed of the truck using engagement studs positioned near the cab of the truck.

19 Claims, 6 Drawing Sheets

PICKUP BED COVER

Priority for this application is claimed from U.S. Provisional patent application Ser. No. 60/148,436, filed on Aug. 11, 1999, and entitled "Pickup Bed Cover".

BACKGROUND OF THE INVENTION

This invention relates generally to truck bed covers and more particularly to security or hard tonneau covers for pickups.

Various security and hard tonneau covers are commercially available. These hard covers serve the purpose of keeping the contents of the truck bed out of view, are generally weather tight and prevent unauthorized entry into the truck bed.

Most hard covers are pivotally mounted to the front of the truck bed and open clamshell-like to the rear. This is mechanically simple, however access to the front of the truck bed is severely restricted. Cargoes tend to shift forward in truck beds, hence items tend to migrate to the front of the tuck bed where they are least accessible. If the cargo extends above the sidewalls of the truck bed, the cover cannot be closed. Even with the cover open, having the front of the cover hinged to the front of the truck bed prohibits hauling large items such as home appliances or motorcycles. Driving with this type of cover in the open position obliterates the driver's rear view.

Another type of hard cover is marketed as the Silver Spring. Both sides of the cover open on folding legs; either or both sides can be open at a time. It has the advantage of good access to the entire truck bed and has proven popular with tradesmen who need to secure their tools while maintaining good access to the truck bed. Another advantage is that the truck can be driven with the cover in the open position to haul items which extend above the sides of the truck bed. A disadvantage is the tedious opening and closing procedure which involves folding two legs on each side and the insertion or removal of locking pins.

Another hard cover is described in U.S. Pat. No. 5,364,154 entitled "Liftable Rigid Truck Bed Cover". This hard cover opens on four legs operating as a parallelogram. From the closed position, the cover lifts upward and rearward along the arc of the pivoting legs. This achieves good access to the pickup bed without the tedium of opening and closing a Silver Spring. However, the geometry of the opening and closing mechanism requires four latch points to secure the cover in the closed position. To keep the cover in the open position, this cover utilizes a height establishing mechanism which locks pins into one of several holes. These mechanisms for locking the cover in the open and closed positions make it expensive to manufacture and more complex than other truck bed covers.

It is clear that there is a need for an improved security cover for pickup beds.

SUMMARY OF THE INVENTION

The invention is a truck bed cover lifting and locking apparatus which provides good access to the truck bed with a minimum of mechanical complexity and excellent operating ease.

The truck bed cover is secured to a bed of a truck using two leg assemblies which are connected to the bed of the truck. In the preferred embodiment, these leg assemblies are generally U-shaped with their associated extensions of the leg assemblies connected to the bed of the truck.

The cover is swivelly connected to these leg assemblies allowing the cover to be raised or lowered. The cover is ideally supported by to linear members which extend between the leg assemblies and onto which the cover (ideally a rigid cover) is supported.

In an "up" position, the cover is locked in position using a locking bar which extends from the cover to the extensions of the rear-most leg assembly. The locking bar is ideally U-shaped with its legs extending into locking mechanisms located on the extensions of the rearmost leg assembly.

To release the locking bar from the locking mechanisms on the leg assembly, a user pulls a handle on the locking bar. This downward pull is translated into an upward motion of the locking bar to effectuate a release allowing the cover to be lowered onto the bed of the truck.

In a "down" position, the cover is locked to the bed of the truck using engagement studs positioned near the cab of the truck. These engagement studs interact with engagements mechanisms (located on the forward-most leg assembly, the linear frame members, or the cover).

In more detail, the invention opens the truck bed cover by lifting it upward and rearward on an approximately 90 degree arc with a plurality of lifting legs. The open cover is held in a generally horizontal position above the truck bed and tailgate.

A unique feature of the invention is the sliding pivot point on the front pair of lifting legs. The front legs are slightly shorter than the rear legs, hence the invention is not a perfect parallelogram. As the cover is closed, the shorter front legs travel in a shorter arc than the longer rear legs. If all of the pivot points of this apparatus were at fixed points, the apparatus would bind up before reaching a closed position. However, as the apparatus nears the closed position, the front legs traverse forward on a sliding pivot point, which in the preferred embodiment, are slotted holes in which pivot bolts reside. This forward traversing action of the front legs allows the apparatus to engage a locking means at the front of the truck bed as the cover reaches the closed position. Another benefit of this automatic front locking means is that it captures the gas lift spring used in the preferred embodiment in a closed position. Rear locking means, which are commonly built into commercially available truck bed covers, secure the rear of the cover.

The sliding pivot point of the front lifting legs makes the apparatus easier to open, because the user can get lifting momentum started at the rear of the cover before the front of the cover begins to raise. As the front lifting legs traverse rearward, the front locking means is disengaged, allowing the front of the cover to begin moving upward with the assistance of a lifting means such as a gas spring.

The apparatus also has a locking means to automatically lock the cover in the open position when it is raised. In the preferred embodiment, a U-Shaped locking tube is utilized to lock the rear lifting legs in their upright position. This U-shaped locking tube is spring loaded at the two pivot points to bias the tube ends downward. The U-shaped locking tube is slightly narrower than the rear lifting legs and fits inside the rear lifting legs. The rear lifting legs have latch points for the locking tube, and as the rear lifting legs reach their open position, the locking tube moves down by gravity and spring pressure and engages the latch points on the rear lifting legs. This prevents the cover from closing until the user releases the locking tube by pulling down the rear hoop portion of the locking tube.

In this context then, the invention provides for an improved pickup cover in which the effective operating radius of the front lifting legs are modified to achieve a front traversing action as the apparatus is near the closed position. In the open position, the front lifting legs are effectively shorter than the rear lifting legs. As the apparatus closes, the front lifting legs reach the same or similar length as the rear lifting legs by use of sliding pivot points or other means of effectively varying the length of the front lifting legs. This translates into a frontward traversing action at the front of the apparatus which enables the invention to engage a front locking means as the apparatus reaches the closed position. This has a number of benefits, such as the front locking means preventing unauthorized entry into the front of the truck bed cover and it also captures the gas spring in the closed position. Another benefit is that as the user opens the bed cover, the rear of the cover begins to lift before the front does. This lets the user impart some opening inertia into the rear part of the cover before the front begins to lift, hence the user does not have to get the entire cover moving at once from a dead stop.

Another part of the apparatus is a remote-controlled power opening and open-locking mechanism. In this embodiment, an electric linear actuator is utilized to obtain the required motion.

The invention provides for a variety of benefits, including, but not limited to, a truck bed cover with:

1) a lifting and locking apparatus which overcomes the disadvantages of the prior art;
2) a lifting and locking apparatus which provides good access to the entire truck bed by lifting the entire cover into a generally horizontal position above the truck bed and tailgate;
3) a lifting and locking apparatus which requires a minimum of moving parts to provide excellent reliability and to minimize manufacturing costs;
4) a lifting and locking apparatus with an open position locking means which automatically locks the cover when it is raised, to prevent unintentional or accidental closing of the cover;
5) a lifting and locking apparatus which automatically secures the front of the cover in a locked position when it is closed to eliminate the need for separate locking means for the front of the cover;
6) a lifting and locking apparatus which can be retrofitted to existing truck bed covers or manufactured with new truck bed covers.

The invention, together with various embodiments thereof, will be more fully illustrated by the accompanying drawings and the following description thereof.

DRAWINGS IN BRIEF

FIG. 1 is a perspective view of the preferred embodiment of the apparatus from the left rear of a truck bed, and shows the apparatus in the open position. For illustrative clarity, the truck bed cover is shown as dashed.

FIG. 2 is a side view of the left half of the preferred embodiment of the apparatus. This view is shown as if the truck bed has been cross-sectioned longitudinally in half, hence the drawing shows the inside of the left truck bed sidewall. The apparatus is shown in the open position. For illustrative clarity, the truck bed cover is omitted from the figure.

FIG. 3 is a side view of the left half of the preferred embodiment of the apparatus. This view is shown as if the truck bed has been cross-sectioned longitudinally in half, hence the drawing shows the inside of the left truck bed sidewall. The apparatus shown in the closed position. For illustrative clarity, the truck bed cover is omitted from the figure.

DRAWINGS IN DETAILED

Figure 1:
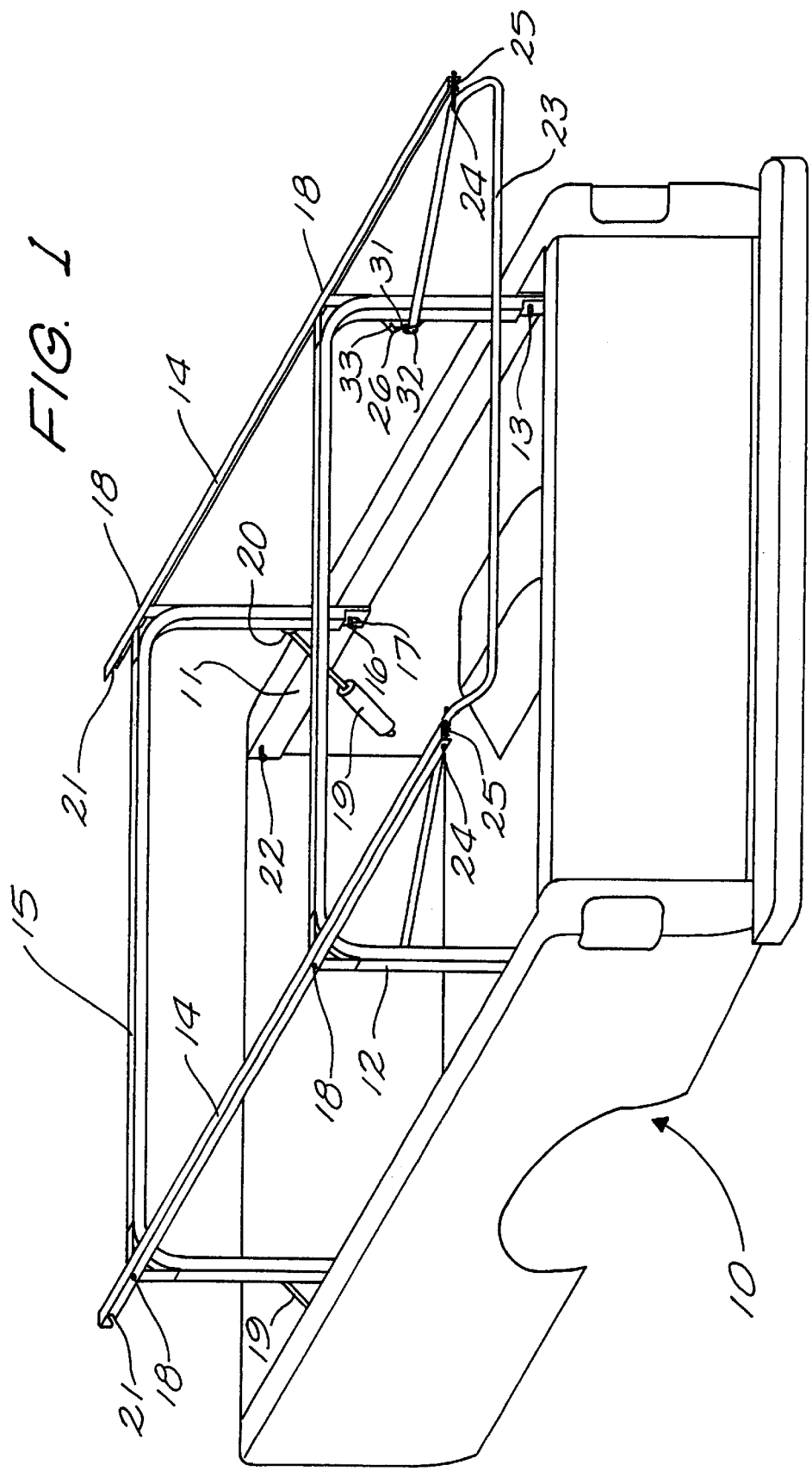

Referring more particularly to the drawings, FIG. 1 shows an invention for lifting and locking a truck bed cover mounted to a truck bed, generally indicated by the numeral 10. In the preferred embodiment, the apparatus is attached to the truck be side rails with mounting strip 11. Attachment to the truck bed side rail can be made with bolts, rivets or other fasteners. A onepiece mounting strip 11 is used in the preferred embodiment to minimize the chance of the installer mis-locating any parts of the apparatus. In the preferred embodiment, mounting strip 11 is terminated forward of the tailgate to avoid interference with the rear locking means which truck bed cover manufacturers install at the rear edges of covers.

Rear lifting legs 12 are attached to the rear of mounting strip 11 with rear pivot bolts 13. In the preferred embodiment, the pair of rear lifting legs are round or rectangular tubes made in a U-shaped form for rigidity and manufacturing economy. Corners are welded to the outsides of the bend radiuses to provide attaching and pivot points for top rails 14.

In the preferred embodiment of the invention, round tubes are used to create the leg assemblies. The use of round legs reduces pinch points to create a safer unit.

Figure 2:
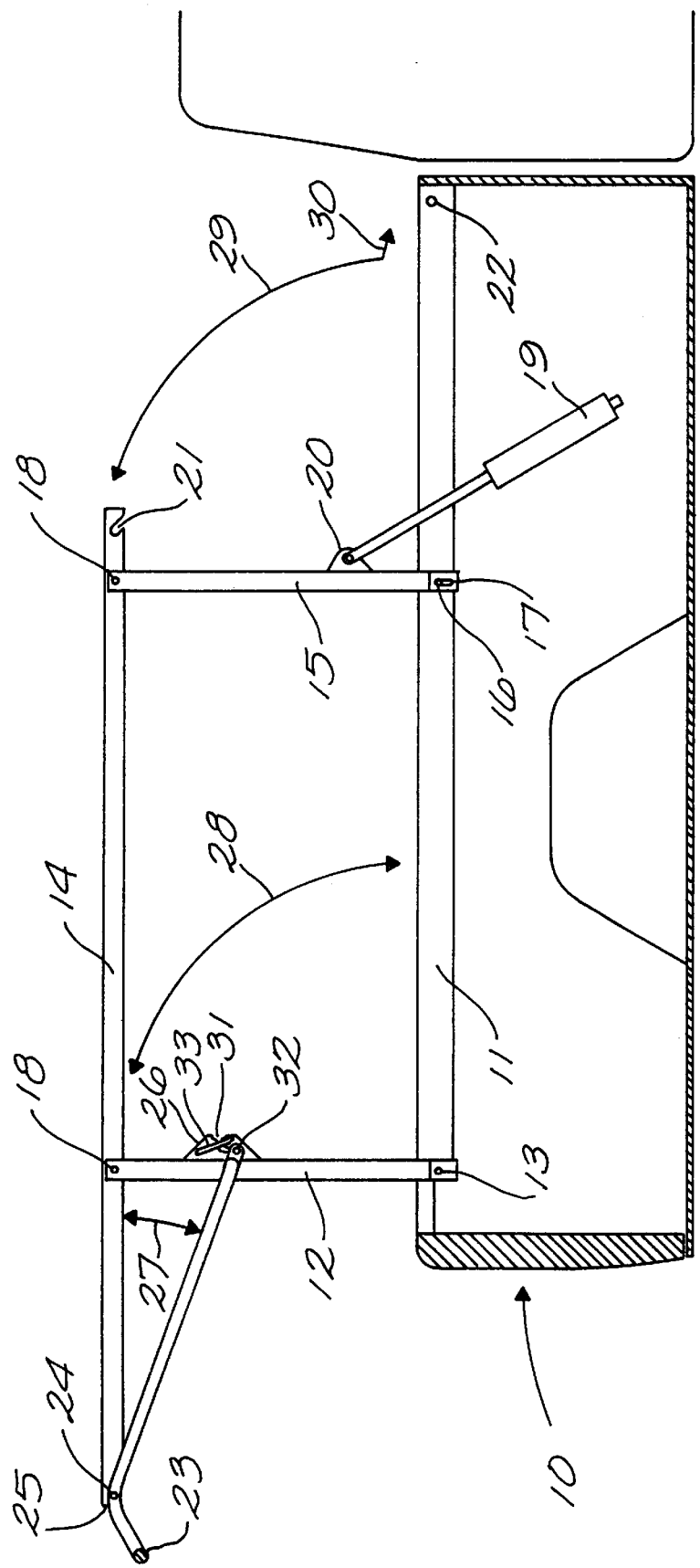
Figure 3:
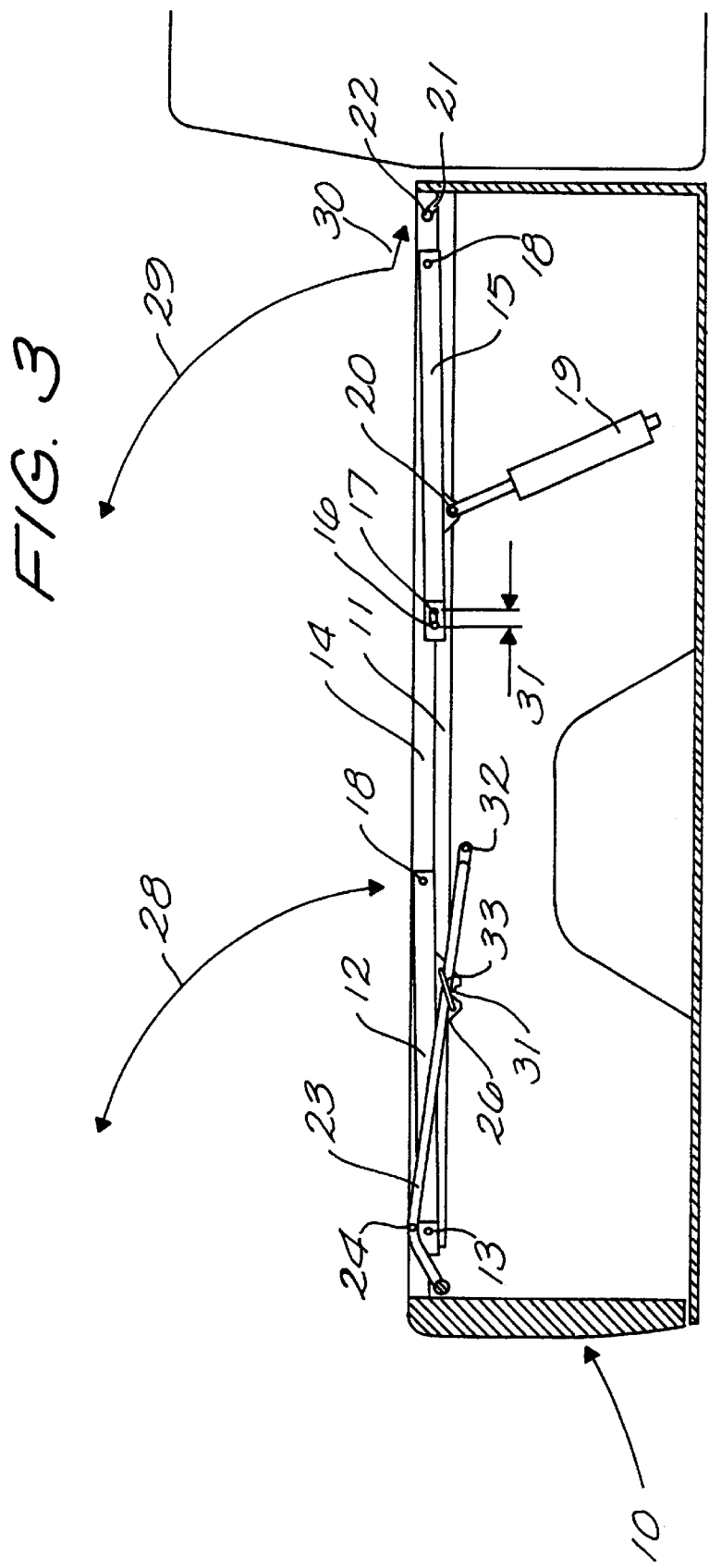

In the preferred embodiment, front lifting legs 15 are attached to mounting strip 11 with pivot bolts 16 fixably attached to mounting strip 11. The sliding pivot point action for the front lifting legs 15 is achieved with slotted holes 17 for pivot bolts 16 along the longitudinal axes of front lifting legs 15. These slotted holes 17 allow front lifting legs 15 to traverse forward as the apparatus reaches its closed position. The slotted hole 17 is best illustrated in FIG. 2 and 3.

Top rails 14 are pivotally attached to rear lifting legs 12 and front lifting legs 15 with top pivot bolts 18.

In one embodiment of the invention, pinch points are reduced by substituting six separate pivot points in lieu of top rails 14 on the inside of the bed cover.

In the preferred embodiment, gas springs 19 are utilized to assist in raising the bed cover to the open position. Gas spring 19 is attached to the inside side wall of truck bed 10 at the butt end and is attached at the rod end to front lifting legs 15 at trunnions 20.

In some embodiments of the invention, gas springs 19 are located to press against the rear leg assembly. Experimentation has determined that the use of gas springs on the rear or distal leg assembly is best for a shorter bed of approximately six feet. The invention is intended to cover both embodiments.

As the apparatus reaches the closed position, the front lifting legs 15 traverse forward along slotted hole 17. This enables the apparatus to engage a front locking means as the cover closes. In the preferred embodiment, front locking slots 21 engage striker bolts 22 to lock the front of the cover.

In the preferred embodiment, locking slot 21 is at about a 45 degree angle from horizontal to achieve a locking action with a minimum of scuffing to the weather strip material of the truck bed cover.

At the rear of the apparatus, locking tube 23 serves to automatically lock the apparatus in its open position to prevent accidental or unintentional closing of the bed cover. In the preferred embodiment, locking tube 23 is a U-shaped tube for rigidity of both sides of the tube assembly and for manufacturing economy. Locking tube 23 is pivotally attached to the pair of top rails 14 with locking tube pivot bolts 24. Torsion springs 25 are biases concentrally located on locking tube pivot bolts 24 between locking tube 23 and top rails 14. Torsion spring 25 biases the front ends of locking tube 23 downward. As the apparatus is raised upward, each end of locking tube 23 slides over latch points 26, which are attached to rear lifting legs 12. When the apparatus reaches the open position, locking tube 23 engages latch points 26. This prevents the apparatus from closing until the user releases locking tube 23 from latch points 26 by pulling down the rear U-shaped part of the locking tube.

Now referring to FIG. 2, the apparatus is shown in a cross-sectional view in the open position. Mounting strip 11 is shown attached to the sidewall of truck bed 10. In this view it is more clearly shown that mounting strip 11 extends from the front of the truck bed to within a few inches of the tailgate. In the preferred embodiment, terminating mounting strip 11 forward of the tailgate avoids interference with any rear locking hardware which bed cover manufacturers install at the rear of the bed covers. Other attaching means may be used with separate mounting brackets for various parts of the apparatus, however a one-piece mounting strip reduces the chance of mis-alignment of parts by the installer.

Rear lifting leg 12 is shown pivotally attached to mounting strip 11 with rear pivot bolts 13.

Front lifting leg 15 is pivotally attached to mounting strip 11 on front pivot bolt 16. Front pivot bolt 16 is fixably attached to mounting strip 11 and resides in slotted hole 17 at the lower side of front lifting leg 15. In the open position, gravity holds front lifting leg 15 down to keep front pivot bolt 16 in the upper part of slotted hole 17. Slotted hole 17 is aligned along the longitudinal axis of front lifting leg 15 and the lower part of this slotted hole can be seen underneath front pivot bolt 16. This makes front lifting leg 15 slightly shorter than rear lifting 12 when the apparatus is in the open position.

In one embodiment of the invention, front pivot bolt 16 is fixably attached to the lower side of front lifting leg 15 and traverses in a substantially horizontal slotted hole in mounting strip 11.

Top rails 14 are pivotally attached to rear lifting legs 12 and front lifting legs 15 with top pivot bolts 18.

Other embodiments of the apparatus may utilize electric linear actuators or other energy-storing or powered means in addition to or in place of gas springs. Powered embodiments of the apparatus may have the lifting means attached to rear lifting legs 12 in a similar manner as the gas spring 19 is shown attached to front lifting legs 15. This rear mounting of powered lifting means could eliminate the need for the locking tube 23 and its related parts. Such a powered embodiment of the apparatus could also eliminate the need for the rear locking hardware which bed cover manufactures install on bed covers. A powered embodiment would lend itself to remote control from the truck cab or a key fob transmitter. A powered embodiment would be even more convenient for the user but would be significantly more expensive to manufacturer.

At the rear of the apparatus, torsion spring 25 biases the front ends of locking tube 23 downward along locking tube arc 27. This spring pressure and gravity cooperate to hold the ends of locking tube 23 into latch points 26. This prevents the apparatus from closing until the user pulls down on the rear part of locking tube 23 to release it from latch point 26.

When opening and closing, rear lifting leg 12 travels along rear lifting leg arc 28. Front lifting leg 15 travels along front lifting leg arc 29, which has a slightly smaller radius than rear lifting leg arc 28. The difference in radius of the front and rear arcs is due to gravity holding front lifting leg 15 down with front pivot bolt 16 in the upper part of slotted hole 17. This makes front lifting leg 15 slightly shorter than rear lifting leg 12, hence front lifting leg arc 29 has a shorter radius than rear lifting leg arc 28. As the apparatus nears the closed position, front lifting leg 15 begins to traverse forward by sliding along slotted hole 17 on front pivot bolt 16. This forward traversing action is shown as forward traverse 30 at the lower part of front lifting leg arc 29. The forward traverse 30 engages the front locking means, which in the preferred embodiment locking slot 21 which engages striker bolt 22.

Now referring to FIG. 3, a cross-sectional view of the apparatus is shown in the closed position. Top rail 14 is retracted to a position approximately at the same height as the truck bed sidewall. Rear lifting leg 12 is shown pivoted forward and downward on rear pivot bolt 13, having traveled along rear lifting leg arc 28. Locking tube 23 is shown residing on top of latch point 26.

Front lifting leg 15 is shown in the closed position, having traveled along front lifting leg arc 29 and front traverse 30. In the preferred embodiment, the front traversing action 30 is achieved when front lifting leg 15 slides forward along slotted hole 17. This front traversing action is also shown as forward traversing distance 31. In this view, front traverse 30 has engaged the front locking means, which is the preferred embodiment is locking slot 21 engaging striking bolt 22.

It is readily apparent to those skilled in the art that forward traverse 30 and forward traversing distance 31 can be achieved by various locations or configurations of slotted holes or movable hinge points in front lifting legs 15, top rails 14, or mounting strip 11 in other embodiments of the apparatus. Variable-length front lifting legs will also achieve the same effect in other embodiments of the apparatus.

Although the invention has herein been shown and described in what is conceived to be the most practical and preferred embodiment, it is recognizes that departures may be made therefrom within the scope of the invention, which is not limited to the illustrative details disclosed.

Figure 4:
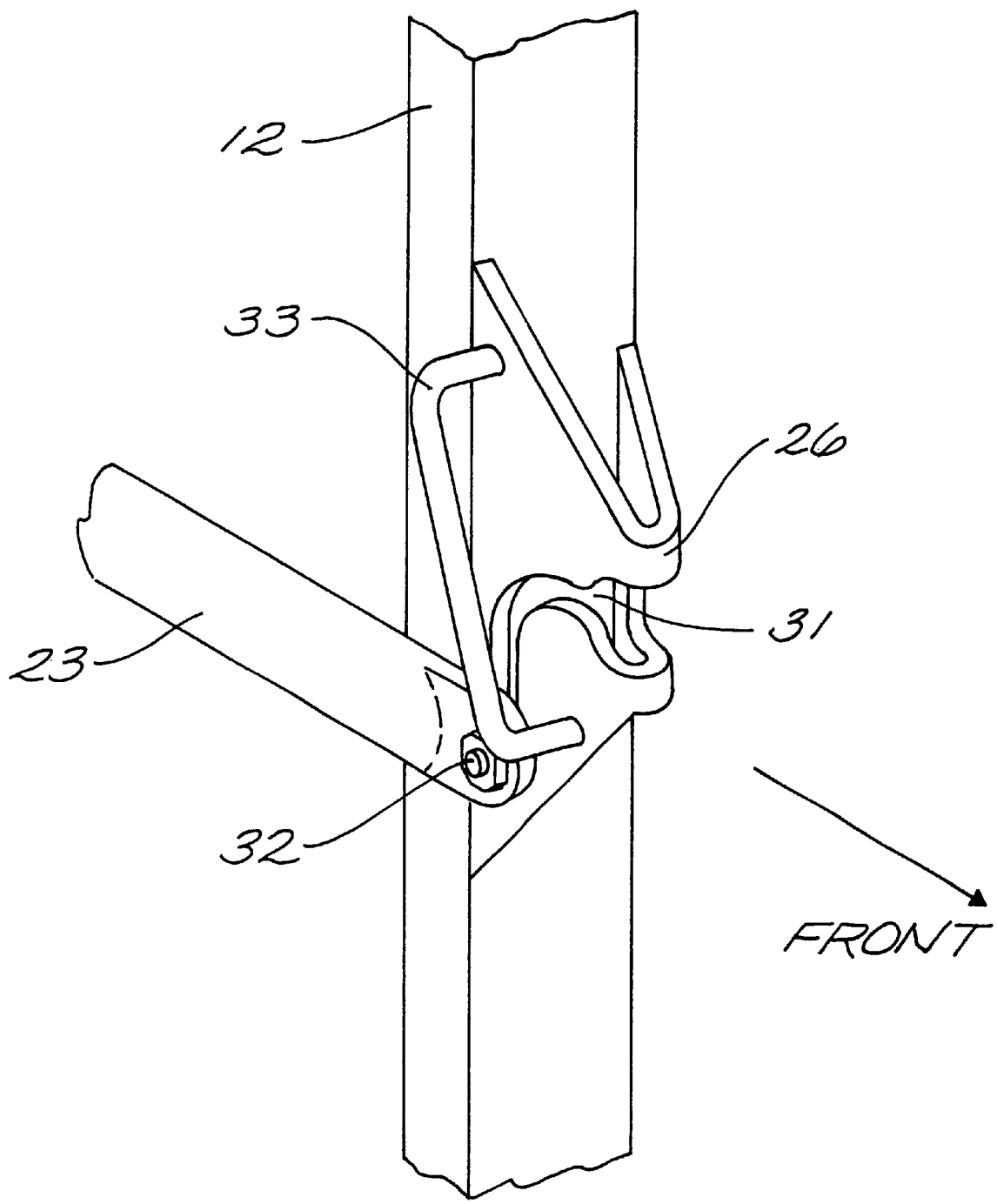
FIG. 4 is a perspective view of the latch in an open position.

FIG. 4 is a perspective view of the latch in an open position.

Latch point 26 is a single piece of metal plate with the rear locking slot 31 cut into it. For manufacturing economy and structural rigidity, the latch point is bent about 300 degrees at the front, with both ends of the latch point welded to the rear lift leg.

In one embodiment of the invention, the ends of locking tube 23 are flattened and holes are punched to accept rear striker bolts 32.

Rear locking slot 31 has a wide opening to ensure that the rear striker bolt 32 enters it as the bed cover nears it open position. The rear locking slot is of a generally arcuate from, which guides the rear striker bolt downward to the bottom of the rear locking slot as the cover reaches the raised position. To close the bed cover, the user pulls down and forward on the rear hoop portion of locking tube 23 to release rear striker bolt 32 from rear locking slot 31.

Latch point 26 also features a guide rod 33 to guide locking tube 23 and rear striker bolt 32 into rear locking slot 31. When the bed cover is in the closed position, locking tube 23 resides with the guide rod 33.

This arrangement for the latch mechanism provides for additional safety since it won't allow the top to slam shut in a crash. The top is held open against front and rear impacts to the vehicle.

Figure 5:
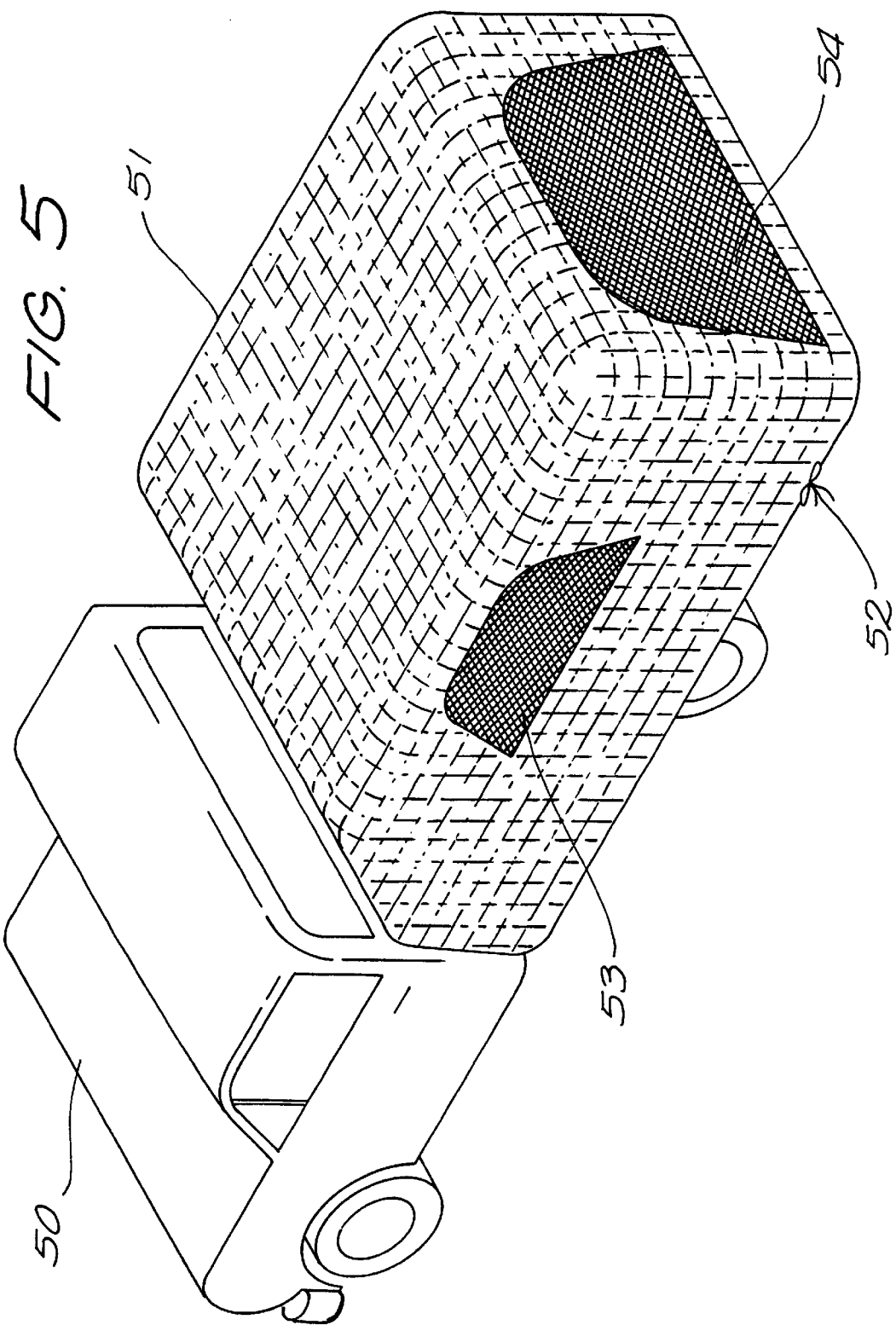
FIG. 5 illustrate an embodiment of the invention which provides a tent for the vehicle.

FIG. 5 illustrate an embodiment of the invention which provides a tent for the vehicle.

In this embodiment of the invention, a tent kit is provided for an expansion of the invention's applications.

The pickup, generally indicated by the numeral 50, has a bed cover as described above in the raised position and the tailgate in the lowered position. The entire bed cover and bed is enclosed within the tent 51, ideally made of a fabric or other canvas-like material.

The embodiment shown here features fixed side windows 53 of insect screen, with zip-up canvas flaps on the inside for when the tent needs to be weather-tight. A rear entry door 54 features zip-up insect screen and an inside zip-up canvas flap to make the tent weather-tight.

Note, the entire tent kit has no hard parts or frame, since it relies totally on the bed cover for support. The tent is easily stowed in a small duffel bag.

Figure 6A:
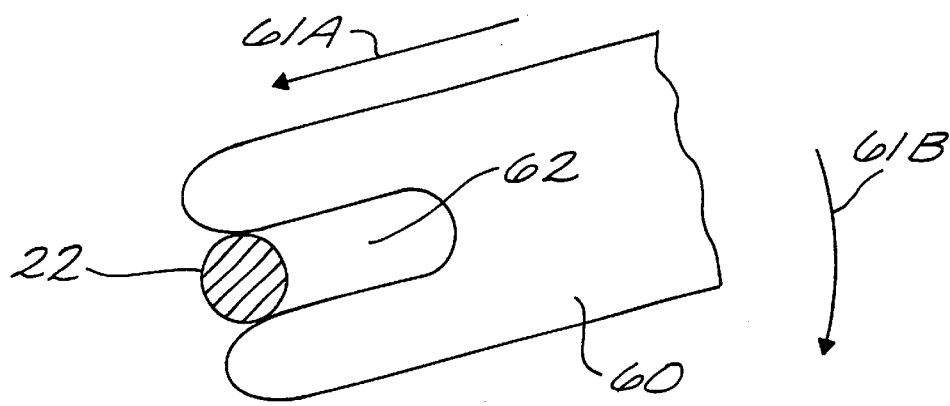
FIGS. 6A and 6B illustrate the forward striker or stud which is used to secure the cover in a closed position.
Figure 6B:
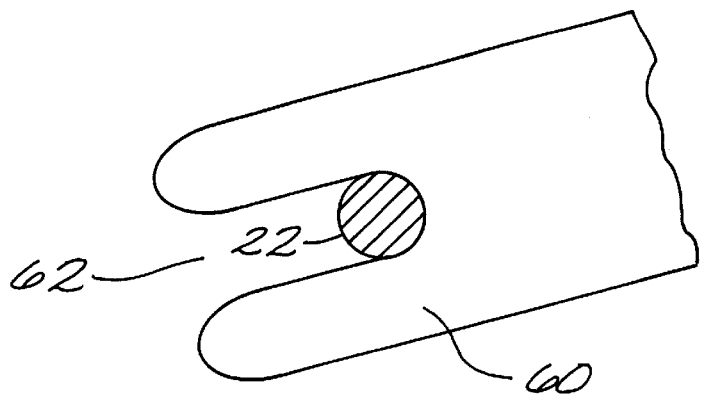

FIGS. 6A and 6B illustrate the forward striker or stud which is used to secure the cover in a closed position.

The illustration of these figures focuses only on the striker or engagement stud and the engagement mechanism used to secure the cover to the engagement stud.

Engagement stud 22 is mounted proximal to the cab of the truck and extends outward. Often the engagement stud 22 is equipped with an outer lip to assist in aligning the engagement mechanism 60 with the stud 22.

Referring to FIG. 6A, while the cover is still tilted, engagement mechanism 60 is pushed forward as indicated by arrow 61A so that locking slot 21 surrounds stud 22. As the cover is pushed downward (as indicated by arrow 61B) and forward (as indicated by arrow 61A) the engagement mechanism 60 is fully secured to stud 22 as indicated in FIG. 6B.

This arrangement provides for a forward locking mechanism which automatically engages when the cover is closed. The forward lock this attribute provides establishes a firm fastening of the cover to the bed of the truck when the cover is closed for travel.

The locking mechanism described in this figure is alternatively employed at several points on the invention, including, but not limited to: the frame; the rigid cover itself; and the forward leg. In an alternative embodiment, engagement mechanism 60 is fixably attached to the truck bed or mounting strip 11 with an engagement stud mounted to the frame, rigid cover, etc.

Once the cover is fully secured, as the pickup goes over uneven terrain, flexing of the cover is minimized. This extends the life of the cover and frame.

Figure 7A:
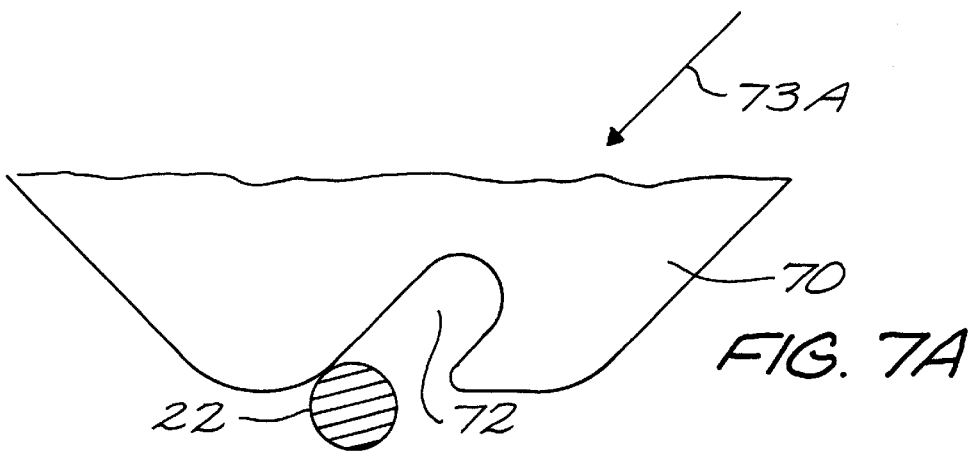
FIGS. 7A and 7B illustrate another embodiment of the forward stud with locking mechanism.
Figure 7B:
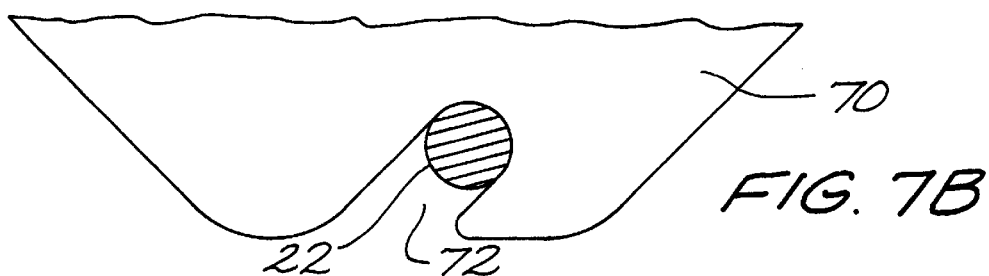

FIGS. 7A and 7B illustrate another embodiment of the forward stud with locking mechanism.

As engagement mechanism 70 is moved forward, engagement stud 22 is slipped into slot 72 (FIG. 7A) until engagement stud 22 is cradled within slot 72.

In this embodiment of the invention, the engagement mechanism 70 moves downward at a 45 degree angle due to the shape of opening 72.

It is clear that the present invention provides for a highly improved and versatile lifting and locking mechanism for a pickup bed cover.

What is claimed is:

1. A truck bed cover secured to a bed of a truck comprising:
   a) a first leg assembly having a first and second extensions swivelly connected to opposing sides of the bed of the truck and positioned proximal to a cab of the truck;
   b) a second leg assembly having a first and second extensions swivelly connected to opposing sides of the bed of the truck and positioned distal to the cab of the truck;
   c) a first linear frame member swivelly secured to said first leg assembly and said second leg assembly parallel to a first side of the bed of the truck;
   d) a second linear frame member swivelly secured to said first leg assembly and said second leg assembly parallel to a second side of the bed of the truck;
   e) a first locking mechanism secured to the first extension of said second leg assembly;
   f) a second locking mechanism secured to the second extension of said second leg assembly; and,
   g) a locking bar being generally U-shaped, said locking bar swivelly connected to a distal end of the first linear frame member and a distal end of the second linear frame member, said locking bar positioned such that when said second leg assembly is in a vertical position, a first leg of said locking bar engages the first locking mechanism, and a second leg of said locking bar engages the second locking mechanism.

2. The truck bed cover according to claim 1 wherein said first leg assembly and said second leg assembly are U-shaped.

3. The truck bed cover according to claim 1, further including:
   a) a first engagement stud secured to the first side of the bed proximal to the cab;
   b) a second engagement stud secured to the second side of the bed proximal to the cab; and wherein,
   c) said first linear member includes an engagement mechanism adapted to engages the first engagement stud when said cover is in a collapsed state; and,
   d) said second linear member includes an engagement mechanism adapted to engage the second engagement stud when said cover is the collapsed state.

4. The truck bed cover according to claim 3, wherein the engagement mechanism of said first linear member locks into the first engagement stud, and the engagement mechanism of the second linear member locks into the second engagement stud as said locking bar is pushed to a forward most position.

5. The truck bed cover according to claim 1, further including,
   a) a first lift assist apparatus secured to the first extension of the first leg assembly and the first side of the bed of the truck; and,
   b) a second lift assist apparatus secured to the second extension of the first leg assembly and the second side of the bed of the truck.

6. The truck bed cover according to claim 1, wherein said first locking mechanism and said second locking mechanism are configured to facilitate disengagement with the first extension and the second extension of the second leg assembly during an upward motion of said first leg and said second leg.

7. The truck bed cover according to claim 6, wherein said locking bar includes a handle positioned to translate a downward motion of said handle into an upward motion of the first leg and the second leg.

8. The truck bed cover according to claim 7, wherein:
   a) the first locking mechanism includes a guide adapted to feed said first leg of the locking bar into said first locking mechanism; and,
   b) the second locking mechanism includes a guide adapted to feed said second leg of the locking bar into said second locking mechanism.

9. A truck bed cover comprising:
   a) a first leg assembly having a first and second extensions swivelly connected to opposing sides of a bed of a truck and positioned proximal to a cab of the truck;
   b) a second leg assembly having a first and second extensions swivelly connected to opposing sides of the bed of the truck and positioned distal to the cab of the truck, said second leg assembly having,
      1) a first locking mechanism secured to the first extension thereof, and,
      2) a second locking mechanism secured to the second extension thereof;
   c) a rigid cover swivelly secured to said first leg assembly and said second leg assembly; and,
   d) a locking bar swivelly connected to said rigid cover and positioned such that when said second leg assembly is in a vertical position, said locking bar engages and locks with both the first locking mechanism and the second locking mechanism.

10. The truck bed cover according to claim 9, wherein said first leg assembly and said second leg assembly are U-shaped.

11. The truck bed cover according to claim 9, further including:
   a) a first engagement stud secured to the first side of the bed;
   b) a second engagement stud secured to the second side of the bed; and wherein,
   c) said first leg assembly includes,
      1) a first engagement mechanism adapted to engage the first engagement stud, and,
      2) a second engagement mechanism adapted to engage the second engagement stud.

12. The truck bed cover according to claim 11, wherein the first engagement mechanism locks into the first engagement stud, and the second engagement mechanism locks into the second engagement stud as said rigid cover is pushed to a forward-most position.

13. The truck bed cover according to claim 9, further including,
   a) a first lift assist apparatus secured to the first extension of the first leg assembly and the bed of the truck; and,
   b) a second lift assist apparatus secured to the second extension of the first leg assembly and the bed of the truck.

14. The truck bed cover according to claim 9, wherein said first locking mechanism and said second locking mechanism are configured to facilitate disengagement with the first extension and the second extension of the second leg assembly during an upward motion of said locking bar.

15. The truck bed cover according to claim 14, wherein said locking bar includes a handle positioned to translate a downward motion of said handle into an upward motion of the first leg and the second leg of said locking bar.

16. The truck bed cover according to claim 15, wherein:
   a) the first locking mechanism includes a guide adapted to feed said locking bar into said first locking mechanism; and,
   b) the second locking mechanism includes a guide adapted to feed said locking bar into said second locking mechanism.

17. A truck bed cover secured to a bed of a truck comprising:
   a) a first leg assembly being generally U-shaped and having a first and second extension swivelly connected to opposing sides of the bed of the truck and positioned proximal to a cab of the truck;
   b) a second leg assembly being generally U-shaped and having a first and second extension swivelly connected to opposing sides of the bed of the truck and positioned distal to the cab of the truck, said second leg assembly having,
      1) a first locking mechanism secured to the first extension, and,
      2) a second locking mechanism secured to the second extension;
   c) a cover swivelly connected to said first leg assembly and said second leg assembly;
   d) a locking bar being generally U-shaped, said locking bar swivelly connected to a distal end of the cover, said locking bar positioned such that when said second leg assembly is in a vertical position, a first leg of said locking bar engages the first locking mechanism and a second leg of said locking bar engages the second locking mechanism.

18. The truck bed cover according to claim 17, further including:
   a) a first engagement stud secured to the first side of the bed proximal to the cab;
   b) a second engagement stud secured to the second side of the bed proximal to the cab; and,
   c) wherein, said cover includes:
      1) a first engagement mechanism adapted to engage the first engagement stud when said cover is in a forward-most position, and,
      2) said second engagement mechanism adapted to engage the second engagement stud when said cover is its forward-most position.

19. The truck bed cover according to claim 17, wherein
   a) said locking bar includes a handle positioned to translate a downward motion of said handle into an upward motion of the first leg and the second leg; and,
   b) said first locking mechanism and said second locking mechanism are configured to facilitate disengagement with the first extension and the second extension of the second leg assembly during an upward motion of said first leg and said second leg of said locking bar.

* * * * *